(12) United States Patent
Hanai et al.

(10) Patent No.: US 9,077,054 B2
(45) Date of Patent: Jul. 7, 2015

(54) BATTERY PACK FOR ELECTRIC POWER TOOL WITH REDUCED DIFFERENCE IN VOLTAGES OF MULTIPLE CELLS CONSTITUTING BATTERY

(71) Applicants: Hiroshi Hanai, Anjo (JP); Hisakazu Okabayashi, Anjo (JP); Toru Yamada, Anjo (JP); Masafumi Noda, Anjo (JP); Takayoshi Endo, Anjo (JP)

(72) Inventors: Hiroshi Hanai, Anjo (JP); Hisakazu Okabayashi, Anjo (JP); Toru Yamada, Anjo (JP); Masafumi Noda, Anjo (JP); Takayoshi Endo, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 399 days.

(21) Appl. No.: 13/628,784

(22) Filed: Sep. 27, 2012

(65) Prior Publication Data
US 2013/0082658 A1    Apr. 4, 2013

(30) Foreign Application Priority Data
Oct. 4, 2011 (JP) ................................. 2011-220489

(51) Int. Cl.
*H02J 7/00* (2006.01)
*H01M 10/48* (2006.01)
*H01M 10/42* (2006.01)

(52) U.S. Cl.
CPC .... *H01M 10/482* (2013.01); *H01M 2010/4271* (2013.01)

(58) Field of Classification Search
CPC .................... H01M 10/482; H01M 2010/4271
See application file for complete search history.

(56) References Cited

U.S. PATENT DOCUMENTS

| 5,153,496 | A  | * | 10/1992 | LaForge ........................ 320/119 |
| 5,691,622 | A  | * | 11/1997 | Mack et al. .................... 320/134 |
| 7,199,556 | B1 | * | 4/2007  | Benckenstein, Jr. et al. . 320/119 |
| 7,417,405 | B2 | * | 8/2008  | Carrier et al. ................. 320/116 |
| 7,626,353 | B2 | * | 12/2009 | Kanouda et al. .............. 320/101 |
| 7,719,231 | B2 | * | 5/2010  | Pellenc ......................... 320/132 |
| 8,212,529 | B2 | * | 7/2012  | Yamamoto .................... 320/134 |
| 8,358,108 | B2 | * | 1/2013  | Seman et al. ................. 320/134 |
| 2009/0058368 | A1 | * | 3/2009 | Seman et al. ................. 320/137 |
| 2010/0019725 | A1 |   | 1/2010 | Nakatsuji |

FOREIGN PATENT DOCUMENTS

JP    A-2008-154317    7/2008

* cited by examiner

*Primary Examiner* — Naum B Levin
(74) *Attorney, Agent, or Firm* — Oliff PLC

(57) ABSTRACT

A battery pack for an electric power tool includes a control device that determines the necessity of a balancing control to reduce difference in voltages of cells of a battery based upon voltages of the respective cells measured by a voltage measuring device. The control device controls a subject cell, which is subject to the balancing control to discharge via the discharging device when the balancing control is determined to be necessary. A voltage measuring device measures the voltages of the respective cells when a battery charger detecting device detects the connection of the battery charger in a state where the battery has not been connected to the battery charger for a predetermined specified period of time or more and power feeding to the electric power tool has not been performed for the specified period of time or more.

10 Claims, 6 Drawing Sheets

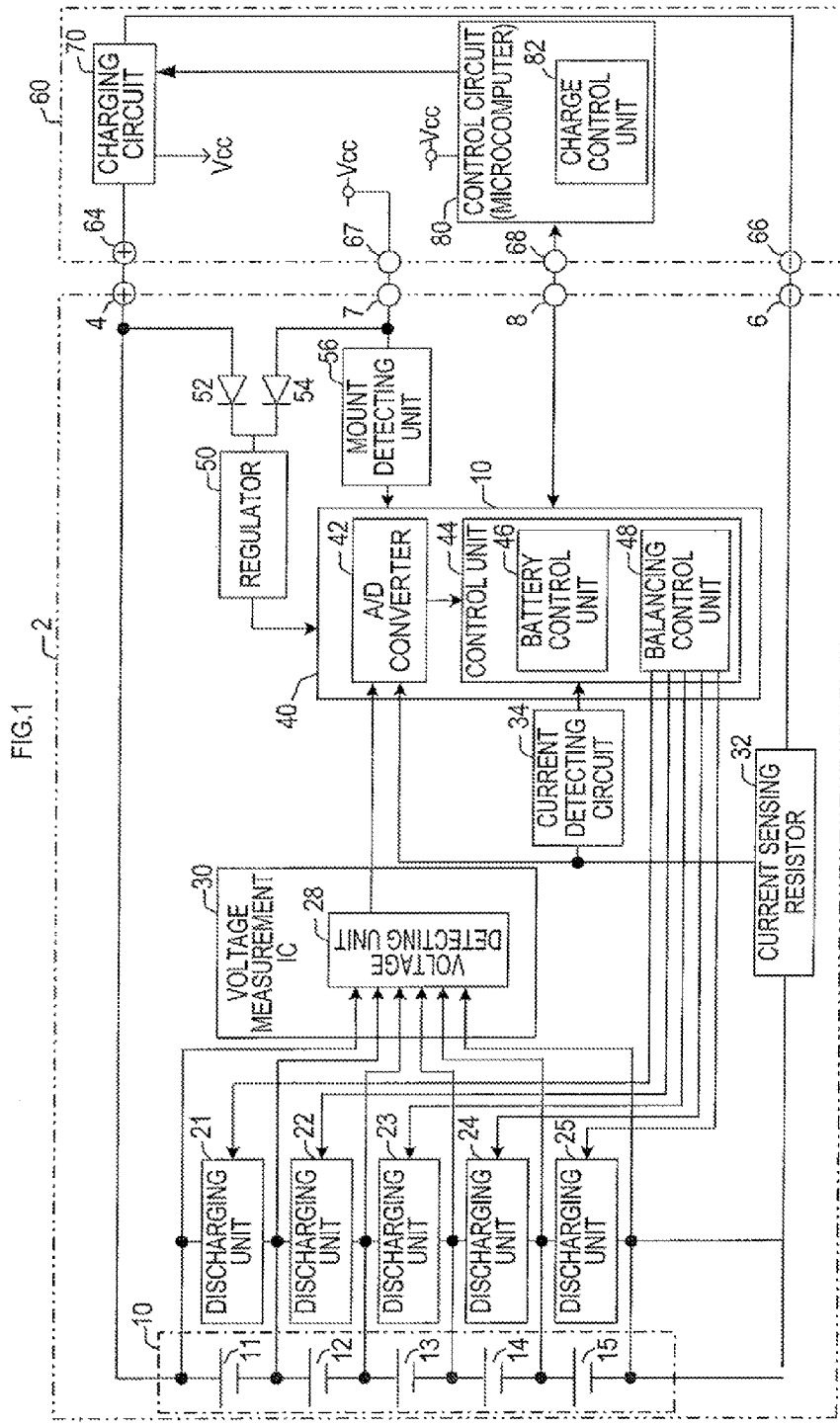

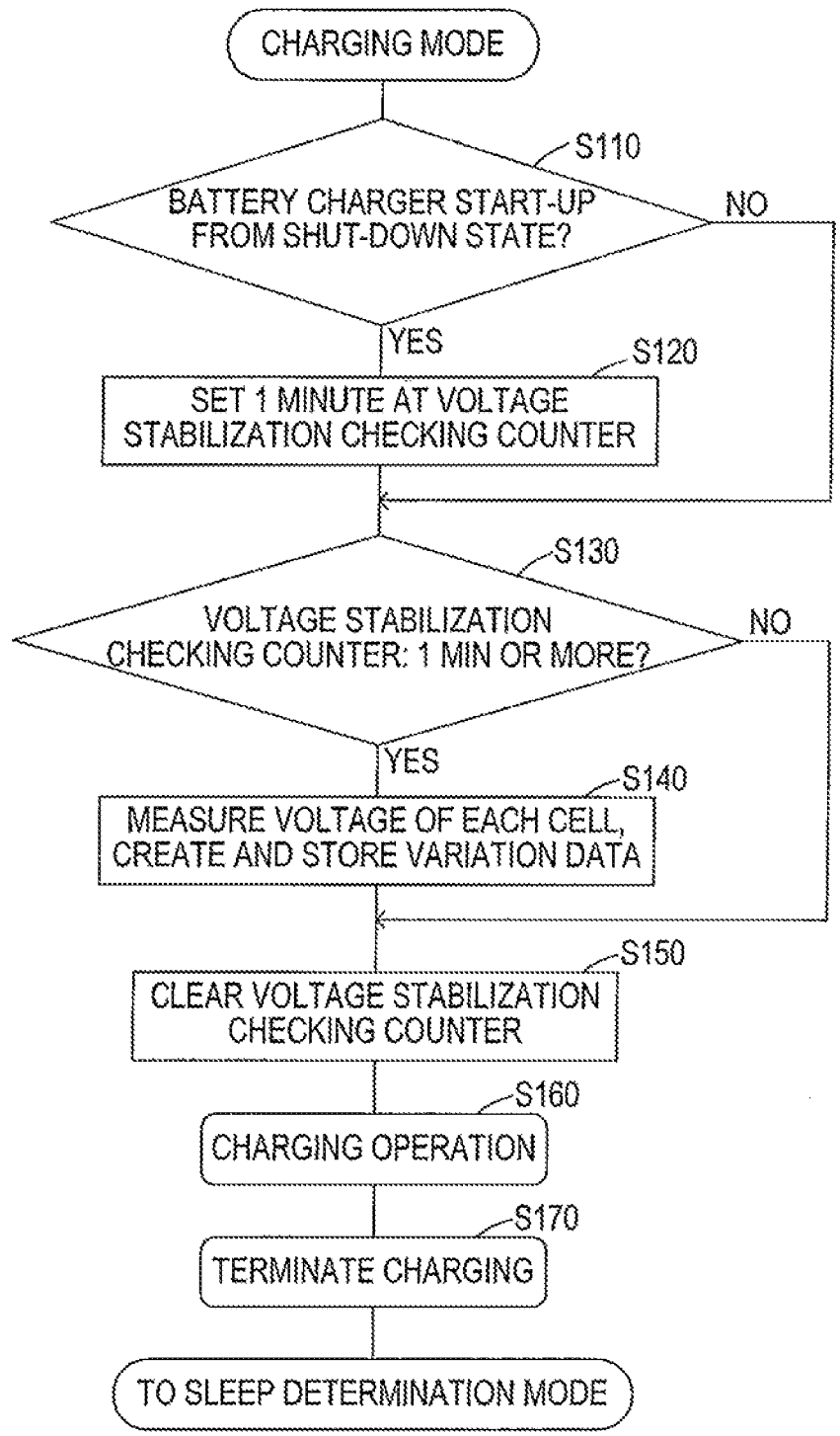

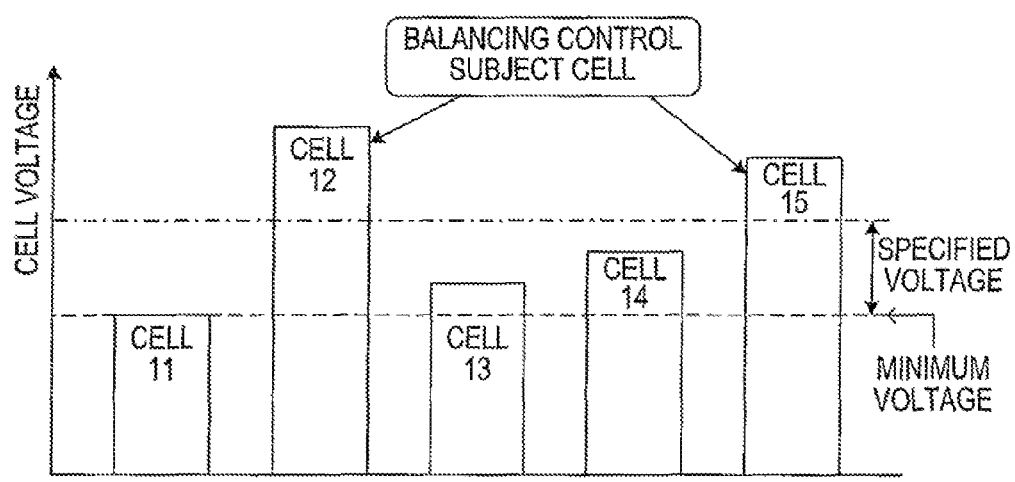

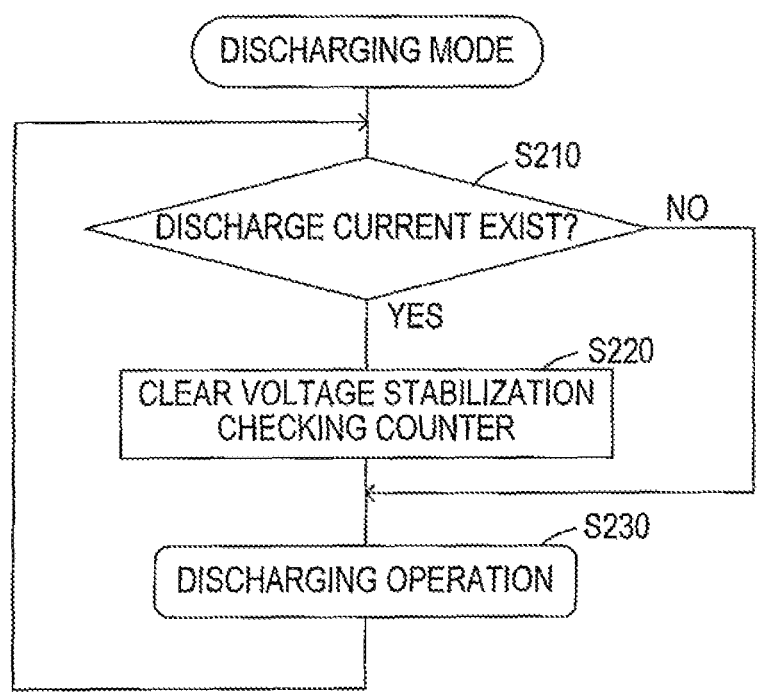

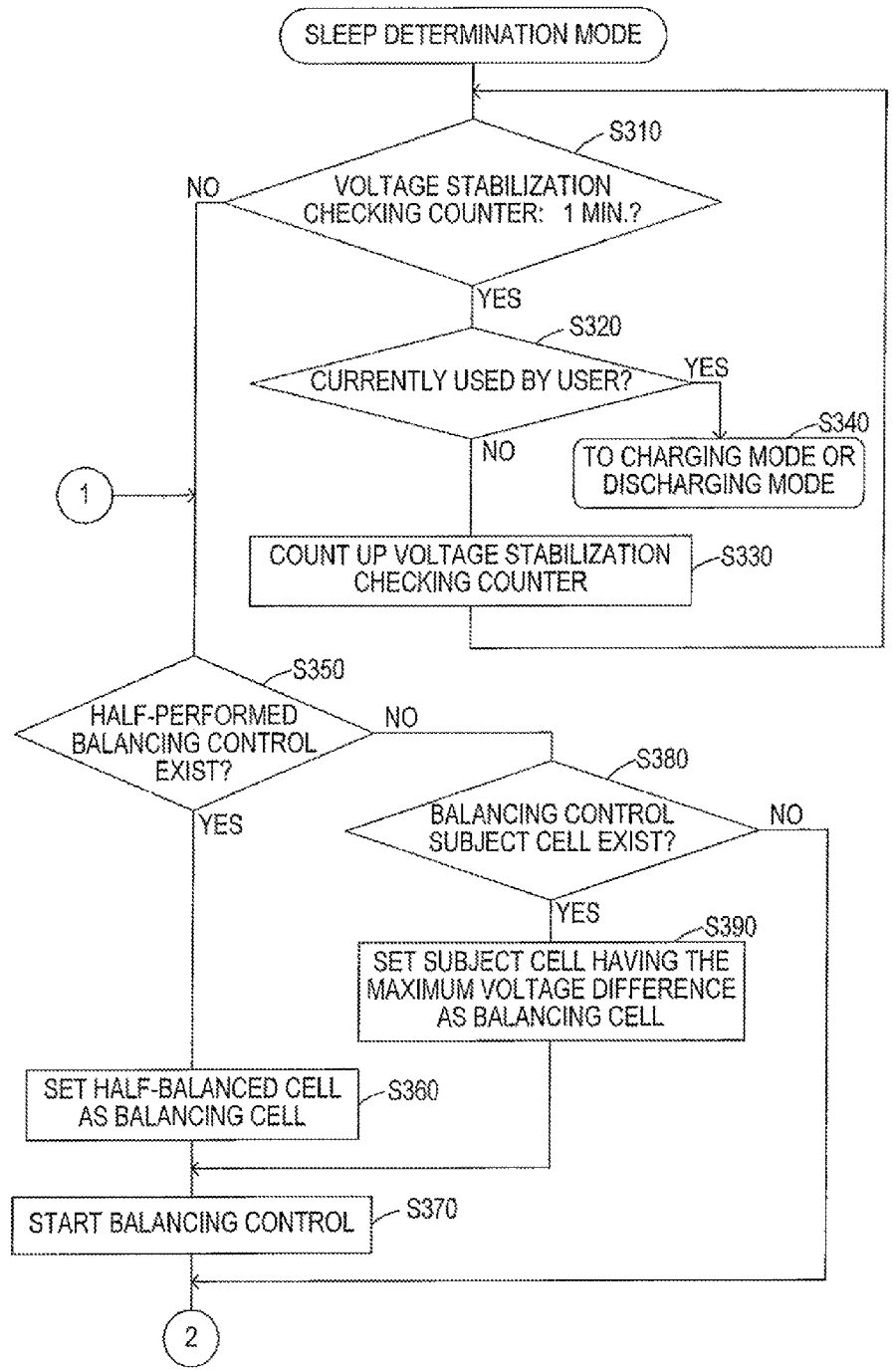

BATTERY PACK FOR ELECTRIC POWER TOOL WITH REDUCED DIFFERENCE IN VOLTAGES OF MULTIPLE CELLS CONSTITUTING BATTERY

CROSS-REFERENCE TO RELATED APPLICATIONS

This application claims the benefit of Japanese Patent Application No. 2011-220489 filed Oct. 4, 2011 in the Japan Patent Office, the disclosure of which is incorporated herein by reference.

BACKGROUND

The present invention relates to a battery pack for an electric power tool constituted by connecting multiple chargeable and dischargeable cells in series.

In this type of battery pack for an electric power tool, when the battery is used repetitively up to an over discharge level, a problem occurs in which capacity imbalance progresses among the cells constituting the battery and the battery life is reduced.

In order to avoid this sort of problem, in JP2008154317A, it is suggested to measure a voltage of each cell at a set timing when a voltage of at least one of the multiple cells reaches or falls below a discharge cutoff voltage and to allow each cell to discharge such that the voltage of each cell is controlled to be the minimum voltage out of all the measured voltages.

That is, according to this device suggested, a balancing control is performed to reduce difference in voltages of the respective cells. In details, the cell/cells having a voltage higher than the minimum voltage is controlled to discharge at a predetermined set timing so that the voltage of each cell stays at the minimum voltage. Accordingly, the voltages of all the cells become substantially the same and the difference in voltages among the cells can be reduced.

SUMMARY

According to the above suggested device, when the voltages of the respective cells are measured and one of the measured voltages is equal to or smaller than the discharge cutoff voltage, or when a user performs a charging operation of the battery pack (mounting of the battery pack on a battery charger etc.), the timing is determined to be the set timing and the balancing control is performed.

Therefore, according to the above suggested device, the balancing control is sometimes performed when electric power is supplied to the electric power tool from the battery pack or immediately after the completion of the electric power supply. In these cases, the balancing control can not sometimes reduce sufficiently the difference in voltages among the cells.

That is, when electric power is supplied to the electric power tool from the battery pack or immediately after the completion of the electric power supply, the voltage of each cell fluctuates due to electric current fed to each cell. According to the above suggested device, in such cases where the voltage is instable as described above, the timing is determined to be the set timing, and the voltage of each cell is measured. The balancing control is hence performed based upon the result of the measuring.

Therefore, according to the above suggested device, it is considered that the difference in voltages among the cells can not be reduced enough, and, in some cases, the difference in voltages among the cells may be increased.

Further, according to the above suggested device, in a case where the necessity of the balancing control is determined based upon whether one of the voltages of the cells is equal to or smaller than the discharge cutoff voltage when supplying electric current to the electric power tool, if the battery pack is electrically charged before the voltage of each cell reaches the discharge cutoff voltage, there is a problem that the balancing control can not be performed.

It is an aspect of the present invention to supply a battery pack for an electric power tool having the balancing function to reduce the difference in voltages of the multiple cells constituting a battery, whereby the differences in voltages among the cells can be reliably reduced by performing the balancing control when the voltages of the respective cells are stable.

The battery pack for an electric power tool according to this aspect of the present invention includes a battery constituted by connecting multiple chargeable and dischargeable cells in series. A voltage measuring device measures voltages of the respective cells.

Further, the battery pack for an electric power tool includes a control device that determines the necessity of a balancing control to reduce difference in voltages of the respective cells based upon the voltages of the respective cells measured by the voltage measuring device. When the balancing control is determined to be necessary balancing control, the control device controls a subject cell, which is subject to the balancing control from among the cells, to discharge via a discharging device.

The voltage measuring device measures the voltages of the respective cells when the battery charger detecting device detects the connection of the battery charger in a state where the battery has not been connected to the battery charger for a predetermined specified period of time or more and power feeding to the electric power tool has not been performed for the specified period of time or more.

Therefore, according to the present invention, the voltages of the respective cells are measured and the balancing control can be performed when a measurement condition is satisfied that the battery is connected to the battery charger when neither charging current to the battery nor discharge current from the battery have been fed for the specified period of time or more (in other words, the voltage of each cell has been stable).

Therefore, the balancing control can be performed based upon the voltages measured when the voltages of the cells have been stable, so that the balancing control can reliably reduce the difference in the voltages of the respective cells.

The voltage measuring device measures the voltage of each cell when the measurement condition is satisfied. The measurement frequency is fairly high compared with measuring based upon a measurement condition that the voltage of one of the cells becomes equal to or lower than the discharge cutoff voltage.

Therefore, the balancing control (discharging of the subject cell) by the control device does not have to be performed to all cells every time when the voltage of each cell is measured, like the conventional device described above.

The control device may select a minimum voltage from among the voltages of the respective cells measured by the voltage measuring device, and, when there is a cell of which voltage is different from the minimum voltage at a specified voltage or greater, the control device may determine the cell as the subject cell and performs the balancing control to the subject cell (discharging of the subject cell).

It is possible to perform, with a high frequency, the balancing control for inhibiting the difference in voltages of the respective cells from exceeding the specified voltage. Therefore, it is possible to inhibit the voltage of each cell from varying over the specified voltage.

When there are multiple subject cells, it is preferable that the control device controls the subject cells to discharge via the discharging device in descending order of a voltage difference between the minimum voltage and the voltages of the respective subject cells.

In this case, it is possible to inhibit effectively the difference in voltages of the respective cells from expanding.

It is preferable that the control device limits a discharging time period for allowing the subject cell to discharge via the discharging device to a predetermined certain discharging time.

Specifically, the control device controls the subject cell to discharge not to control the voltage of the subject cell to be the minimum voltage but by limiting the discharging time period to a certain time period.

Therefore, according to the present invention, in order to perform the balancing control, there is no need to allow the subject cell to discharge while monitoring the voltage of the subject cell, and the structure of the control system can be hence simplified.

According to the present invention, it may happen that a single balancing control (discharging of the subject cell) may not be able to control the voltage difference between the voltage of the subject cell and the minimum voltage to be equal to or smaller than the specified voltage. However, according to the battery pack for an electric power tool of the present invention, it is possible to raise the frequency of performing the balancing control, thereby enabling to inhibit the voltages of the respective cells from varying over the specified voltage.

Further, as described in JP2008154317A, the control device is considered to perform the balancing control (discharging of the subject cell) prior to the initiation of the charging after the battery is connected to the battery charger. But, in this case, the timing of charging by the battery charger is delayed.

Still further, if the control device performs the balancing control (discharging of the subject cell) at a time of power feeding from the battery to the electric power tool or immediately after the completion of the power feeding, discharging for the voltage balancing can not be performed appropriately. As a result, it is not possible to reduce effectively the difference in voltages of the cells.

Accordingly, according to the battery pack for an electric power tool of the present invention, it is preferable that the control device controls the subject cell to discharge via the discharging device when the battery has not been connected to the battery charger for the specified period of time or more and when the power feeding from the battery to the electric power tool has not been performed for the specified period of time or more.

It is preferable that the control device controls the subject cell to discharge via the discharging device when the specified period of time or more has elapsed since the completion of charging the battery by the battery charger and when the power feeding from the battery to the electric power tool has not been performed for the specified period of time or more.

In these cases, the balancing control to allow the subject cell to discharge as well as the voltage measurement of each cell can be performed when electric current has not been supplied to each cell and the voltage thereof is hence stable. Accordingly, it is possible to perform the balancing control more effectively and reduce the difference in voltages of the cells.

It is preferable to stop the balancing control because the discharge current flows to the battery if the power feeding is initiated from the battery to the electric power tool when the balancing control (discharging of the subject cell) is running. In the same manner, it is preferable to stop the balancing control because the charging current flows to the battery if the battery is connected to the battery charger when the balancing control (discharging of the subject cell) is running.

Specifically, when the balancing control has been executed by the control device, if the power feeding (discharging of the battery) is initiated from the battery to the electric power tool, it is preferable to store the discharging time period of the subject cell by the discharging device and interrupt the discharging from the subject cell.

After interrupting the discharging from the subject cell described above, it is preferable that the control devices resume the discharging from the subject cell when a condition is satisfied that the power feeding from the battery to the electric power tool has not been performed for the specified period of time or more and the battery charger detecting device does not detect the connection of the battery charger.

When resuming as described above, it is preferable to control the subject cell to discharge assuming that the discharging time period stored at a time of the interruption of the discharging has elapsed.

In this case, even if the power feeding from the battery to the electric power tool is initiated and the balancing control is stopped, if the power feeding to the electric power tool is stopped thereafter and the voltage of the battery is stabilized, it is possible to continue the balancing control once interrupted.

Meanwhile, if the battery charger detecting device detects the connection of the battery charger in a state where the balancing control has been implemented by the control device, the voltage measuring device measures the voltages of the respective cells. Therefore, in this case, it is preferable that the control device stops the balancing control and thereafter the voltage measuring device measures the voltages of the respective cells. The control device then newly determines the necessity of the balancing control based upon the latest voltages of the respective cells measured after stopping the balancing control. The balancing control may be performed when needed.

BRIEF DESCRIPTION OF THE DRAWINGS

The present invention will be described by way of example with reference to the accompanying drawings, in which:

FIG. 1 is a block diagram showing circuit configurations of a battery pack and a battery charger of an embodiment;

FIG. 2 is a flowchart illustrating a control process performed in a charging mode;

FIG. 3 is an explanatory view for explaining voltage variation data generated through the control process in FIG. 2;

FIG. 4 is a flowchart illustrating a control process performed in a discharging mode; and FIGS. 5A and 5B are flowcharts illustrating a control process performed in a sleep determination mode.

DETAILED DESCRIPTION OF THE PREFERRED EMBODIMENTS

Figure 5B:
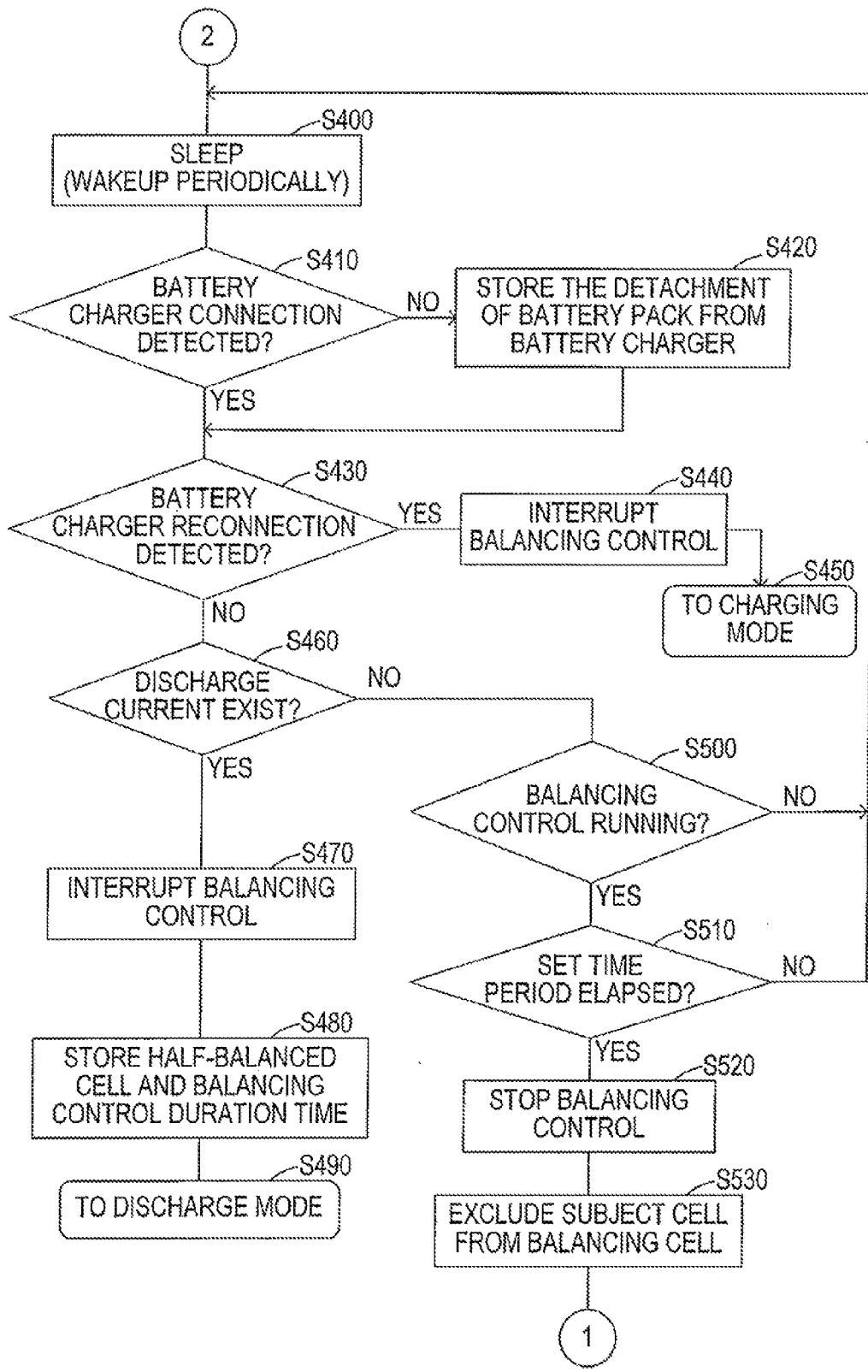

As illustrated in FIG. 1, a battery pack 2 for an electric power tool of the embodiment has a battery 10 composed of multiple chargeable and dischargeable cells 11, 12, 13, 14, and 15 (five cells in FIG. 1) connected in series.

A casing of the battery pack 2 is configured so as to be selectively mounted on either a battery charger 60 or the electric power tool (not illustrated).

The positive and negative electrodes of the battery 10 are connected respectively to terminals 4 and 6. When the casing of the battery pack 2 is mounted on the battery charger 60, the terminals 4 and 6 are connected respectively to terminals 64 and 66 being positive and negative electrodes arranged in the battery charger 60.

Accordingly, when the battery pack 2 is attached to the battery charger 60, the battery 10 can be electrically charged by the battery charger 60 via the terminals 4 and 6 and the terminals 64 and 66.

When the battery pack 2 is attached to the electric power tool, the battery 10 can supply electric power to the electric power tool (in other words, discharging of the battery 10) via the terminals 4, 6 and terminals of the electric power tool.

The battery 10 is connected to a voltage measurement IC 30 that detects voltages of the respective cells 11, 12, 13, 14, and 15. The voltage measurement IC 30 houses therein a voltage detecting unit 28 connected to both ends of each cell 11, 12, 13, 14, and 15 so as to detect voltages at both ends of each cell 11, 12, 13, 14, and 15. The voltage measurement IC 30 outputs, to a control circuit 40, a detection signal corresponding to the voltage of each cell 11, 12, 13, 14, and 15 detected by the voltage detecting unit 28.

The cells 11, 12, 13, 14, and 15 of the battery 10 are connected in parallel respectively to discharging units 21, 22, 23, 24, and 25, in which both ends of each cell 11, 12, 13, 14, and 15 are connected via a resistor that limits a discharge current. Therefore, each cell 11, 12, 13, 14, and 15 can discharge at an approximately constant current.

Disposed in a connection line connecting the negative electrode of the battery 10 and the terminal 6 is a current sensing resistor 32 to detect a discharge current fed to the electric power tool mounted with the battery pack 2 and a charging current fed from the battery charger 60 mounted with the battery pack 2.

The current sensing resistor 32 is connected to a current detecting circuit 34 that detects discharging or charging of the battery 10 based upon the voltages at both ends of the current sensing resistor 32.

The current sensing resistor 32 is further connected to the control circuit 40. The control circuit 40 is configured with a one-chip microcomputer having a CPU, a ROM, a RAM, and so on, and includes an A/D converter 42 and a control unit 44.

The control unit 44 is a function block of the control circuit 40 which is achieved when the CPU performs various control processes described later in accordance with control programs stored in the ROM. The control unit 44 includes a battery control unit 46 and a balancing control unit 48. When the charging/discharging of the battery 10 is carried out, the battery control unit 46 performs a known battery control to monitor the charging/discharge current and the battery voltage and to interrupt the charging/discharging when an abnormal state is monitored.

The A/D converter 42 converts, to digital data, the voltage values at both ends of the current sensing resistor 32 (in other words, charging/discharge current) and the voltages of the respective cells 11, 12, 13, 14, and 15 measured by the voltage measurement IC 30, according to a command from the control unit 44. The A/D converter 42 then outputs the digital data.

The battery pack 2 is further provided with terminals 7 and 8. When the battery pack 2 is mounted on the battery charger 60, the terminal 7 serves to receive electric power Vcc supplied from the battery charger 60, while the terminal 8 serves to connect the control circuit 40 to a control circuit 80 of the battery charger 60 for data communication.

The control circuit 80 of the battery charger 60 is comprised of a microcomputer as is the case with the control circuit 40 of the battery pack 2, and a communication port of the control circuit 80 is connected to a terminal 68. When the battery pack 2 is mounted on the battery charger 60, the terminal 68 is connected to the terminal 8 of the battery pack 2, whereby data communication is allowed between the control circuit 80 of the battery charger 60 and the control circuit 40 of the battery pack 2.

The battery charger 60 is further provided with a charging circuit 70, which charges the battery 10 of the battery pack 2 by receiving electric power supplied from an external commercial power source and so on. When the battery pack 2 is mounted on the battery charger 60, the charging circuit 70 is connected to the battery 10 of the battery pack 2 via the terminals 64, 66, 4, and 6.

The control circuit 80 of the battery charger 60 is provided with a charge control unit 82 that controls the charging of the battery 10 by the charging circuit 70. This charge control unit 82 is a function block achieved by the CPU, which constitutes the control circuit 80, performing a charge control process in accordance with control programs stored in the ROM and so on.

When electrically charging the battery 10, the charge control unit 82 obtains the battery voltage and the charging current from the control circuit 40 of the battery pack 2 and performs the charge control according to the data obtained.

In the battery charger 60, a power-supply voltage Vcc of the control circuit 80 is supplied from a constant voltage power-supply circuit (not illustrated) embedded in the charging circuit 70. Further, the battery charger 60 is provided with a terminal 67 for power supply. When the battery pack 2 is mounted on the battery charger 60, the terminal 67 is connected to the terminal 7 for power receiving of the battery pack 2. The power-supply voltage Vcc supplied from the charging circuit 70 to the control circuit 80 is also applied to this terminal 67. Therefore, when the battery pack 2 is mounted on the battery charger 60, the power-supply voltage Vcc is applied to the terminal 7 of the battery pack 2 from the terminal 67.

In the battery pack 2, the terminal 7 is connected to a diode 54 and a mount detecting unit 56 that detects, based upon the voltage of the terminal 7, the mounting of the battery pack 2 on the battery charger 60.

The diode 54 is connected, at its anode, to the terminal 7 and, at its cathode, to a regulator 50 being a constant voltage power-supply circuit of the battery pack 2, whereby the power-supply voltage VCC is allowed to be supplied from the battery charger 60 to the regulator 50.

The regulator 50 is connected to the positive electrode of the battery 10 via a diode 52. The diode 52 is connected, at its anode, to the positive electrode of the battery 10 and, at its cathode, to the regulator 50.

Accordingly, in a state where the battery pack 2 has been mounted on the battery charger 60, if the battery voltage is higher than the power-supply voltage Vcc of the battery charger 60, the regulator 50 is supplied with power from the battery 10 so as to generate power-supply voltage for internal circuits such as the control circuit 40 and so on.

Meanwhile, when the battery voltage is lower than the power-supply voltage Vcc of the battery charger 60 clue to the power feeding from the battery 10 to the electric power tool, the regulator 50 operates in response to the power-supply voltage Vcc of the battery charger 60 so as to generate power-supply voltage for the internal circuits such as the control circuit 40 and so on.

Regarding the battery pack 2 constituted described above according to the embodiment, there are four operation modes of the control circuit 40: a charging mode, a discharging mode, a sleep determination mode, and a low-voltage mode.

The charging mode is an operation mode to perform the charging from the battery charger 60 to the battery 10 when the mount detecting unit 56 detects the mounting of the battery pack 2 on the battery charger 60. In this charging mode, the control circuit 40 operates along the flowchart illustrated in FIG. 2.

The discharging mode is an operation mode to control discharging to the electric power tool when the current detecting circuit 34 detects the discharging from the battery pack 2 to the electric power tool (in other words, mounting of the battery pack 2 on the electric power tool). In this discharging mode, the control circuit 40 operates along the flowchart illustrated in FIG. 4.

The sleep determination mode is an operation mode to determine the switching from the charging or discharging mode to a sleep state and the switching from the sleep state to the charging or discharging mode (wakeup). In this sleep determination mode, the control circuit 40 operates along the flowchart illustrated in FIGS. 5A and 5B.

The low-voltage mode is an operation mode to stop the operation of the control circuit 40 itself (shut down) when the control circuit 40 malfunctions due to the battery voltage drop or the power supply outage from the battery charger 60.

Specifically, in this low-voltage mode, the control circuit 40 stops (shut downs) its operation, for example, when the battery voltage is equal to or lower than a predetermined voltage value for a predetermined period of time (e.g., two minutes) and the power-supply voltage generated by the regulator 50 is equal to or lower than a predetermined voltage value for a predetermined period of time (e.g., ten μs).

Alternatively, it is preferable that the control circuit 40 stops (shut downs) its operation when the voltage of at least one of the cells 11, 12, 13, 14, and 15 detected by the voltage detecting unit 28 is equal to or lower than a predetermined voltage value.

Further, in a state where the control circuit 40 has been shut down, when the battery pack 2 is connected to the battery charger 60, the power-supply voltage Vcc is supplied from the battery charger 60 to the battery pack 2, and as a result thereof, the power-supply voltage is supplied from the regulator 50 to the control circuit 40. Accordingly, the control circuit 40 is activated so as to initiate the control process in the charging mode described below.

Described below is the control process performed by the control circuit 40 in each operation mode: the charging mode, the discharging mode, and the sleep determination mode.

As illustrated in FIG. 2, through the control process performed in the charging mode, first of all at S110, the control circuit 40 determines whether the switching to the charging mode of this cycle has been arisen by the starting-up from the shut-down state associated with the connection to the battery charger 60 (hereinafter, referred to as battery charger startup).

When the control circuit 40 determines at S110 that the transition to the charging mode of this cycle is the result of the battery charger startup, the process proceeds to S120, where a count value is set at a voltage stabilization checking counter, the count value which corresponds to a specified period of time (one minute according to the embodiment) for checking voltage stabilization. The process then proceeds to S180.

When the control circuit 40 determines at S110 that the switching to the charging mode of this cycle is not due to the battery charger startup, the process proceeds directly to S130 from S110.

The voltage stabilization checking counter is cleared during the charging or discharging of the battery and is counted up at another time. Therefore, the voltage stabilization checking counter serves as a timing counter that times an elapsed time for which the battery has not electrically charged or discharged.

At S130, the control circuit 40 determines whether the count value (i.e., timing period) by the voltage stabilization checking counter is equal to or greater than the specified period of time (one minute).

When the control circuit 40 determines at S130 that the timing period by the voltage stabilization checking counter is equal to or greater than the specified period of time (one minute), the process proceeds to S140, wherein the voltage of each cell 11, 12, 13, 14, and 15 constituting the battery 10 is measured via the voltage measurement IC 30 (specifically, voltage detecting unit 28).

At S140, as illustrated in FIG. 3, the control circuit 40 extracts the minimum voltage being the lowest voltage from among the measured voltages of the cells 11, 12, 13, 14, and 15 and calculates the differences between the minimum voltage and the measured voltages of the respective cells 11, 12, 13, 14, and 15. The differences are referred to create a variation data denoting variations in voltages of the respective cells 11, 12, 13, 14, and 15, and the variation data is stored in a memory (RAM).

When the timing period by the voltage stabilization checking counter is determined to be less than the specified period of time (one minute) at S130, the process proceeds from S130 to S150. Further, when the variation data is created and stored at S140, the process proceeds from S140 to S150. At S150, the voltage stabilization checking counter is cleared and then the process proceeds to S160.

At S160, the control circuit 40 performs a charging operation by which a charging request signal, which requests charging the battery 10, is outputted to the control circuit 80 of the battery charger 60 so as to initiate charging from the charging circuit 70 to the battery 10 and to thereafter monitor the battery voltage and the charging current.

When the charging of the battery 10 by the charging operation at S160 is completed, the process proceeds to S170, wherein the control circuit 40 performs a charging cease process to cease charging of the battery 10 by communicating with the control circuit 80 of the battery charger 60 for the cease of charging. The operation mode of the control circuit 40 is then switched to the sleep determination mode.

As described above, according to the embodiment, when the control circuit 40 initiates operating in the charging mode with the battery pack 2 mounted on the battery charger 60, and the control circuit 40 confirms that the timing period by the voltage stabilization checking counter is equal to or greater than the specified period of time (one minute) (in other words, confirms that the voltage of each cell 11, 12, 13, 14, and 15 has been stable), the control circuit creates the variation data illustrated in FIG. 3.

Further, according to the embodiment, at S120, the control circuit 40 sets the count value corresponding to the specified period of time (one minute) at the voltage stabilization checking counter. This is because the process at S120 is implemented when the control circuit is started up from the shut-down state in response to the connection of the battery pack 2 to the battery charger 60.

That is, when the operation mode of the control circuit 40 enters the charging mode under such a start-up condition, it is considered that neither charging nor discharging of the battery 10 have been performed at least for the specified period of time or more, and that the voltage of each cell 11, 12, 13, 14, and 15 has been stable.

However, when the control circuit 40 has been at the shut-down state, the voltage stabilization checking counter does not count up the count value. In this case, immediately after the starting up of the control circuit 40 from the shut-down state, the voltage stabilization checking counter is at an initial status with the count value set to zero.

Therefore, according to the embodiment, when the control circuit 40 is started up from the shut-down state and enters the charging mode, the count value of the voltage stabilization checking counter is set at S120 to a value corresponding to the specified period of time (one minute), so that the process at S140 is performed without fail.

As illustrated in FIG. 4, through the control process in the discharging mode, first of all at S210, the control circuit 40 reads the value of the discharge current from the battery pack 2 to the electric power tool through the A/D converter 42 and determines whether the discharge current is actually flowing.

When the discharge current exists, the process proceeds to S220, wherein the voltage stabilization checking counter is cleared, and the process then proceeds to S230. Meanwhile, when the discharge current does not exist, the process proceeds to S230 directly from S210.

At S230, the control circuit 40 monitors whether the discharge current is normal or not. When the discharge current is abnormal, the control circuit 40 stops the discharging through a discharging operation. The process proceeds to S210 again.

As described above, in the discharging mode, when the discharge current is flowing due to the power-supply from the battery 10 to the electric power tool, the voltage stabilization checking counter is cleared.

As illustrated in FIGS. 5A and 5B, through the control process implemented in the sleep determination mode, the control circuit 40 determines at S310 whether the count value (i.e., timing period) of the voltage stabilization checking counter is smaller than the specified period of time (one minute).

When the timing period by the voltage stabilization checking counter is determined at S310 to be smaller than the specified period of time (one minute), the process proceeds to S320, wherein the control circuit 40 determines whether the battery pack 2 is in use by a user, i.e., whether charging or discharging of the battery has been performed.

The current detecting circuit 34 is, for example, employed for this determination. When the current detecting circuit 34 detects the charging current or the discharge current, the battery pack 2 is determined to be in use by a user.

When the battery pack 2 is determined at S320 to be in use by a user, the process proceeds to S340, wherein the operation mode of the control circuit 40 is switched to either the charging mode or the discharging mode in response to the usage state of the battery pack 2 by the user.

When the battery pack 2 is determined at S320 not to be in use, the process proceeds to S330, wherein the timing period of the voltage stabilization checking counter is updated by incrementing (plus one) the count value of the voltage stabilization checking counter. The process then proceeds to S310 again.

The steps from S310 to S340 are performed also when the control circuit 40 is in the discharging mode. When the discharge current is not flowing, the voltage stabilization checking counter counts up at S330.

When the timing period by the voltage stabilization checking counter is determined at S310 not to be smaller than the specified period of time (one minute), the process proceeds to S350, wherein the control circuit 40 determines whether a balancing control has been done halfway, which controls either the cell 11, 12, 13, 14, or to discharge by use of either the discharging unit 21, 22, 23, 24, or 25.

When there is a balancing control interrupted halfway, the process proceeds to S360, wherein the control circuit 40 sets, as a balancing cell, the cell for which the balancing control has not been completed. At S370, the control circuit 40 initiates the balancing control to the balancing cell.

As described above, the balancing cell is set to a cell for which the balancing control has been done halfway. However, the term "halfway" should not be construed as limited to exactly the middle time point through the whole balancing control and should be applied to any time point therethrough.

This balancing control is performed by turning on the discharging unit (either 21, 22, 23, 24, or 25) provided for the balancing cell (either the cell 11, 12, 13, 14, or 15) and by allowing the balancing cell to discharge at an approximately constant electric current. The duration for discharging is preset at a constant period of time.

When the control circuit 40 determines at S350 that there is no balancing control left that has been done partially, the process proceeds to S380, wherein the control circuit 40 determines, based upon the variation data (see FIG. 3) created at S140 of the charging mode and stored in the memory (RAM), whether there is a balancing-control subject cell to be performed with the balancing control.

The process at S380 is performed based upon the variation data in FIG. 3 to determine whether there is a cell that has a voltage being different from the minimum voltage at a specified voltage or more and has not been applied with the balancing control.

When the control circuit 40 determines at S380 that there is the balancing-control subject cell, the process proceeds to S390, wherein the control circuit 40 sets, as the balancing cell, the cell of which voltage difference to the minimum voltage is the largest among the cells determined to be the balancing-control subject cell. At S370, the control circuit 40 initiates the balancing control to the balancing cell.

Next, the process proceeds to S400 when the balancing control is initiated at S370 or when the control circuit 40 determines at S380 that there is no balancing-control subject cell. At S400, the operation mode of the control circuit 40 enters to the sleep mode.

Once the control circuit 40 is switched to a sleep state at S400, the control circuit 40 wakes up in response to an input of a current detection signal from the current detecting circuit 34 (in other words, the usage of the battery pack 2 by a user) or in response to an activation command issued by an internal timer every predetermined time (e.g., 0.5 second). As a result, the processes of and after S410 are performed.

At S410, the control circuit 40 determines whether the mount detecting unit 56 has detected the mounting of the battery pack 2 on the battery charger 60. When the mount detecting unit 56 has not detected the mounting of the battery pack 2 on the battery charger 60, the process proceeds to S420, wherein the control circuit stores, in the memory (RAM), the detachment of the battery pack 2 from the battery charger 60. The process then proceeds to S430 from S420. Meanwhile, when the mount detecting unit 56 has detected the mounting of the battery pack 2 on the battery charger 60, the process proceeds to S430 directly from S410.

At S430, the control circuit 40 determines whether the mount detecting unit 56 detects the mounting (i.e., remounting) of the battery pack 2 on the battery charger 60 in a state where the memory (RAM) has stored therein the detachment of the battery pack 2 from the battery charger 60.

When the control circuit 40 determines at S430 the re-mounting of the battery pack 2 on the battery charger 60, the control circuit 40 interrupts at S440 the balancing control currently being performed. At S450, the operation mode of the control circuit 40 is switched to the charging mode.

Meanwhile, when the control circuit 40 does not determines at S430 the re-mounting of the battery pack 2 on the battery charger 60, the process proceeds to S460, wherein the control circuit 40 determines whether the detecting circuit 34 detects the discharge current from the battery 10 to the electric power tool.

When the current detecting circuit 34 detects the discharge current, the process proceeds from S460 to S470, wherein the control circuit 40 interrupts the balancing control being currently performed and the process proceeds to S480.

At S480, the control circuit 40 identifies, as a half-balanced cell, a cell for which the balancing control was interrupted at S470, and stores the half-balanced cell in the memory (RAM). The control circuit 40 also stores, in the memory (RAM), a duration time for which the balancing control was performed to the half-balanced cell (i.e., a discharging time period of the half-balanced cell). Thereafter, at S490, the operation mode of the control circuit 40 is switched to the discharging mode.

When the control circuit 40 does not determine at S460 the detection of the discharge current by the current detecting circuit 34, the process proceeds from S460 to S500, wherein the control circuit 40 determines whether the balancing control is running.

When the balancing control is not currently in execution, the process proceeds to S400. When the balancing control is currently in execution, the process proceeds to S510, wherein the control circuit 40 determines whether the balancing control is in execution for a predetermined set time period (certain time period) or more.

When the control circuit 40 does not determine at S510 that the balancing control is in execution for the set time period or more, the process proceeds to S400. When the control circuit 40 determines at S510 that the balancing control is in execution for the set time period or more, the process proceeds to S520, wherein the balancing control is stopped.

The set time period of the balancing control is set at a certain discharging time period.

Regarding the process at S510, if the duration time, for which the balancing control had been performed to the half-balanced cell before the interruption of the balancing control for the half-balanced cell, has been stored in the memory (RAM) through the processes at S470, S480, the control circuit 40 adds, at S510, a duration time for which the balancing control has been performed to the half-balanced cell again after the re-start of the balancing control into the duration time before the interruption of the balancing control for the half-balanced cell. At S510, the control circuit 40 determines whether a duration time obtained by adding these two duration times is equal to or greater than the set period of time.

At S520, the balancing control currently running is stopped. At S530, the control circuit 40 excludes the cell, for which the balancing control was stopped, from the balancing-control subject cell. The process then proceeds to S350.

As described above, in the sleep determination mode, the control circuit 40 counts the period where neither charging nor discharging of the battery 10 have been performed, by counting up the voltage stabilization checking counter (S330).

When the battery pack 2 is attached to the battery charger 60 (S410, S430) and the operation mode of the control circuit 40 is switched to the charging mode in a state where the timing period by the voltage stabilization checking counter is equal to or greater than the specified period of time (one minute), the voltage of each cell 11, 12, 138, 14, and 15 is measured and the control circuit 40 creates the variation data illustrated in FIG. 3 (S140).

Therefore, the variation data is created accurately based upon the voltage of each cell 11, 12, 13, 14, and 15 measured when neither charging nor discharging by the battery 10 have been performed for the specified period of time or more and each cell 11, 12, 13, 14, and 15 has been stable.

Further, in the sleep determination mode, when the timing period by the voltage stabilization checking counter is equal to or greater than the specified period of time (one minute), the balancing cell is determined based upon the variation data and the balancing control is performed to the balancing cell (S310-S400).

Discharging of each cell 11, 12, 13, 14, and 15 by this balancing control is performed only for the predetermined set time period (certain time period) per balancing-control subject cell (S510-S530).

Once the power feeding (discharging) to the electric power tool is initiated while the balancing control is in execution, the balancing control is interrupted temporarily (S460, S470). Thereafter, when the execution condition of the balancing control is satisfied, the balancing control temporarily interrupted is resumed (S350-S370). Accordingly, the discharging time period of the balancing-control subject cell is limited to the set time period.

Therefore, according to the battery pack 2 of the embodiment, the balancing control can be performed by use of the variation data created based upon the voltages measured when the cells 11, 12, 13, 14, and 15 have been stable. This balancing control can reduce reliably the difference among the voltages of the respective cells 11, 13, 14, and 15.

Still further, the discharging time period by this balancing control is limited to the certain set time period. Accordingly, compared with a known device that controls a balancing-control subject cell to discharge so that the voltage thereof is controlled to be the minimum voltage, it is possible to simplify the configuration (operation) of the control system.

According to the embodiment, it sometimes happens that the discharging of the balancing-control subject cell by a single balancing control may not be enough to control the difference between the voltage of the balancing-control subject cell and the minimum voltage at the specified voltage or smaller.

However, according to the embodiment, the variation data is created in the charging mode, and thereafter the charging mode is switched to the sleep determination mode. The balancing control is hence performed in the sleep determination mode based upon the latest variation data.

Therefore, according to the embodiment, it is possible to enhance the frequency to perform the balancing control, compared with the conventional device that performs the balancing control when the voltage of one of the cells falls around the discharge cutoff voltage.

As a result, it is possible to inhibit the voltage of each cell from varying over the specified voltage even if the discharging time period by the balancing control is limited to the certain set time period.

According to the embodiment, when the battery pack 2 is detached from the battery charger 60 and re-mounted thereon while the balancing control is running, the balancing control is interrupted and the operation mode of the control circuit 40 is switched to the charging mode (S430-S450).

In this case, since the latest variation data is created in the charging mode, the balancing control is interrupted without storing the half-balanced cell and the duration time for which the balancing control was performed. When the performing condition of the balancing control is satisfied thereafter, a new balancing control is initiated based upon the latest variation data.

Therefore, when the balancing control is resumed after the balancing control was interrupted in association with the switching to the charging mode, it is possible to perform a balancing control appropriately based upon the latest variation data created in the charging mode.

According to the embodiment, the balancing control is not implemented prior to the initiation of the charging of the battery 10 immediately after the variation data was created in the charging mode. The balancing control is implemented after the charging of the battery 10 is completed in the charging mode and then the operation mode is switched from the charging mode to the sleep determination modes.

Therefore, it is possible to inhibit a problem that the balancing control is performed and the charging from the battery charger 60 to the battery 10 is hence delayed during a time period from the mounting of the battery pack 2 on the battery charger 60 to an initiation of the charging of the battery 10.

According to the embodiment, the casing and the terminals 4, 6 of the battery pack 2 correspond to an example of a connecting device of the present invention. The discharging units 21, 22, 23, 24, and 25 correspond to an example of a discharging device of the present invention. The mount detecting unit 56 corresponds to an example of a battery charger detecting device of the present invention.

The function as the voltage measuring device of the present invention is achieved by the voltage detecting unit 28 and the control process implemented by the control circuit 40 in the charging mode, for example. The function as a control device of the present invention is achieved by the control process implemented by the control circuit 40 in the sleep determination mode, for example.

The present invention should not be construed as limited to the embodiment set forth above and can be achieved in any modes within the scope of the present invention.

For example, according to the embodiment, the operation mode of the control circuit 40 is switched to the sleep determination mode when the charging of the battery 10 is completed in the charging mode. When the performing condition of the balancing control is satisfied in the sleep determination mode, the balancing control is initiated.

Therefore, according to the embodiment, as long as the charging to the battery 10 has been completed, the balancing control is performed even when the battery pack 2 has been mounted on the battery charger 60.

Meanwhile, it is preferable to further limit the performing condition of the balancing control so that the balancing control is not performed when the battery pack 2 is mounted on the battery charger 60 and is performed when the battery pack 2 is separated from the battery charger 60.

In this case, the balancing control is performed when the battery 10 is at a release state not being connected to the battery charger 60 or the electric power tool (i.e., when the voltage of each cell 11, 12, 13, 14, and 15 constituting the battery 10 is surely at a stable state), thereby enabling to reduce effectively the difference in voltages of the cells 11, 12, 13, 14, and 15.

As described above, in order to perform the balancing control when the battery pack 2 has been detached from the battery charger 60, it is preferable that, when the battery pack 2 has been mounted on the battery charger 60, the control circuit 40 stays in the charging mode even after the completion of charging to the battery 10.

In this case, however, the processes of S310 to S340 in FIG. 5A are performed also when the control circuit 40 is in the charging mode, and when the charging current is not flowing, it is necessary to count up the voltage stabilization checking counter at S330.

Further, it is only necessary to change the processes of S410 to S440 of FIG. 5B such that the control circuit 40 simply determines whether the battery pack 2 has been mounted on the battery charger 60. Specifically, when the battery pack 2 has been mounted on the battery charger 60, the operation mode of the control circuit 40 is switched form the sleep determination mode to the charging mode. Meanwhile, when the battery pack 2 has not been mounted thereon, the process proceeds to S460.

According to the embodiment, the microcomputer configuring the control circuit 40 and the voltage measurement IC 30 configuring the voltage detecting unit 28 are separated constitutionally. However, the control circuit 40 and the voltage measurement IC 30 may be constituted integrally by embedding the voltage detecting unit 28 in the microcomputer of the control circuit 40.

According to the embodiment, each discharging unit 21, 22, 23, 24, and 25 is provided with a resistor for limiting the discharge current. In order to perform the balancing control, a constant amount of discharge current is fed by turning on the discharging unit 21, 22, 23, 24, or 25 corresponding to the balancing-control subject cell (balancing cell). However, a constant amount of discharge current may be supplied by duty driving the discharging units 21, 22, 23, 24, and 25 with a pulse signal having a constant pulse width by a controlled duty ratio.

According to the embodiment, the battery 10 includes five cells in series. It is however preferable to arrange the cells in parallel so as to increase the battery capacity. Further, it is preferable to increase the number of sells arranged in series so as to increase the voltage level.

What is claimed is:

1. A battery pack for an electric power tool, comprising:
a battery constituted by connecting multiple chargeable and dischargeable cells in series;
a connecting device that connects selectively a battery charger or the electric power tool to the battery;
a battery charger detecting device that detects a connection of the battery charger to the connecting device;
a voltage measuring device that measures voltages of the respective cells, the voltage measuring device measuring the voltages of the respective cells when the battery charger detecting device detects the connection of the battery charger to the connecting device in a state where the battery has not been connected to the battery charger for a predetermined specified period of time or more and power feeding to the electric power tool has not been performed for the specified period of time or more;
a discharging device that allows the cells to discharge individually; and
a control device that determines the necessity of a balancing control to reduce difference in voltages of the respective cells based upon the voltages of the respective cells measured by the voltage measuring device, the control device that controls a subject cell, which is subject to the balancing control from among the cells, to discharge via the discharging device when the balancing control is determined to be necessary.

2. The battery pack for an electric power tool according to claim 1, wherein the control device selects a minimum voltage from among the voltages of the respective cells measured by the voltage measuring device, and, when there is a cell of which voltage is different from the minimum voltage at a specified voltage or greater, the control device determines that the balancing control for the cell being the subject cell is needed and controls the subject cell to discharge via the discharging device.

3. The battery pack for an electric power tool according to claim 2, wherein, when there are multiple subject cells, the control device controls the subject cells to discharge via the discharging device in descending order of a voltage difference between the minimum voltage and the voltages of the respective subject cells.

4. The battery pack for an electric power tool according to claim 1, wherein the control device limits a discharging time period for allowing the subject cell to discharge via the discharging device to a predetermined certain discharging time.

5. The battery pack for an electric power tool according to claim 1, wherein the control device controls the subject cell to discharge via the discharging device when the battery has not been connected to the battery charger for the specified period of time or more and when the power feeding from the battery to the electric power tool has not been performed for the specified period of time or more.

6. The battery pack for an electric power tool according to claim 5, wherein the control device stores a discharging time period of the subject cell by the discharging device and interrupts the discharging from the subject cell if power feeding is initiated from the battery to the electric power tool when the balancing control has been executed by the control device, and thereafter, when the power feeding from the battery to the electric power tool has stopped for the specified period of time or more and when the battery charger detecting device does not detect the connection of the battery charger to the connecting device, the control device assumes that the discharging time period stored at a time of the interruption of the discharging has elapsed and initiates the discharging from the subject cell.

7. The battery pack for an electric power tool according to claim 1, wherein the control device controls the subject cell to discharge via the discharging device when the specified period of time or more has elapsed from the completion of charging the battery by the battery charger and when the power feeding from the battery to the electric power tool has not been performed for the specified period of time or more.

8. The battery pack for an electric power tool according to claim 7, wherein the control device stores the discharging time period of the subject cell by the discharging device and interrupts the discharging from the subject cell when the power feeding from the battery to the electric power tool is initiated in a state where the balancing control for allowing the subject cell to discharge via the discharging device is in execution, and the control device thereafter determines that the discharging time period stored when the discharging was interrupted has elapsed and resume the discharging from the subject cell when the power feeding from the battery to the electric power tool has stopped for the specified period of time or more and when the battery charger detecting device does not detect the connection of the battery charger to the connecting device.

9. The battery pack for an electric power tool according to claim 1, wherein the control device stops the balancing control when the connection of the battery charger is detected by the battery charger detecting device in a state where the balancing control for allowing the subject cell to discharge via the discharging device is in execution, and, thereafter when the voltages of the respective cells are measured by the voltage measuring device, the control device determines the necessity of the balancing control based upon the measured voltages of the respective cells.

10. A battery pack for an electric power tool, comprising:
a battery constituted by connecting multiple chargeable and dischargeable cells in series;
a connecting device that connects selectively a battery charger or the electric power tool to the battery;
a voltage measuring device that measures voltages of the respective cells;
a discharging device that allows the cells to discharge individually;
a control device that determines the necessity of a balancing control to reduce difference in voltages of the respective cells based upon the voltages of the respective cells measured by the voltage measuring device, the control device that controls a subject cell, which is subject to the balancing control from among the cells, to discharge via the discharging device when the balancing control is determined to be necessary;
a battery charger detecting device that detects a connection of the battery charger to the connecting device;
a determination device that determines that the battery has not been connected to the battery charger for a predetermined specified period of time or more and power feeding to the electric power tool has not been performed for the specified period of time or more, and that the connection of the battery charger to the connecting device has been detected by the battery charger detecting device; and
a voltage measurement control device configured to cause the voltage measuring device to measure the voltages of the respective cells in response to a determination by the determination device that the battery has not been connected to the battery charger for the predetermined specified period of time or more and the power feeding to the electric power tool has not been performed for the specified period of time or more, and that the connection of the battery charger to the connecting device has been detected by the battery charger detecting device.

* * * * *